H. B. HOLLIFIELD.
AUTOMOBILE ATTACHMENT.
APPLICATION FILED AUG. 7, 1918.

1,307,402.

Patented June 24, 1919.

Witness
Edwin L. Bradford

Inventor
Horatio B. Hollifield
By
Greene & Greene
Attorneys

UNITED STATES PATENT OFFICE.

HORATIO B. HOLLIFIELD, OF WASHINGTON, DISTRICT OF COLUMBIA.

AUTOMOBILE ATTACHMENT.

1,307,402.  Specification of Letters Patent.  Patented June 24, 1919.

Application filed August 7, 1918. Serial No. 248,739.

*To all whom it may concern:*

Be it known that I, HORATIO B. HOLLIFIELD, a citizen of the United States, and resident of Washington, in the District of Columbia, have invented certain new and useful Improvements in Automobile Attachments, of which the following is a specification, reference being had therein to the accompanying drawing.

Those who drive automobiles over badly constructed country roads are sometimes stalled in mud or sand and must seek outside help. Sometimes this cannot be had on the day of the mishap, and often assistance is obtained only after much delay and at a considerable cost. The general object is to avoid this evil by providing devices readily carried by the automobile and capable of effectively using the power of the automobile engine for extricating the machine.

In the accompanying drawings.

In these views, A represents a part of an automobile having a wheel B at the center of which a member C projects in the line of the axis. When it is desired to make use of my devices, for example, when the wheel being sunk in sand or mud fails to advance when rotated, the cap commonly screwed upon the member C is removed and in its place a cap D is screwed home. This latter cap has an integral stub shaft, or axle-extension, E on which is a sleeve F having rigid arms G adapted to pass between the spokes of the wheel and preferably slightly hooked to engage behind the spokes. When the sleeve has been moved inward along the shaft to bring the arms into place, it is rigidly fixed by means of a set screw F' or other suitable devices. When desired, a preferably eccentric roller H is mounted on the shaft to slide without relative rotation and is locked at any desired point by a set screw H'. The peripheral surface of the roller is roughened or provided with ribs or spur teeth so that it will engage, and not slip, upon, a log, rail, plank, or the like. The sleeve is also provided with a hook I or equivalent means for attaching a wire cable or rope J in position for winding upon the axle extension when the wheel rotates.

Figure 1:
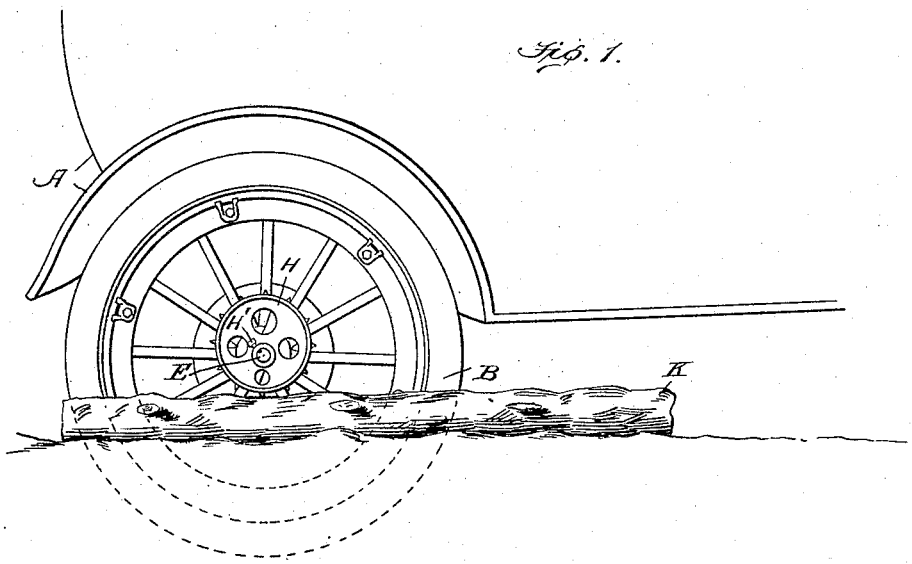
Figure 1 shows in side elevation a portion of an automobile provided with my devices.
Figure 2:
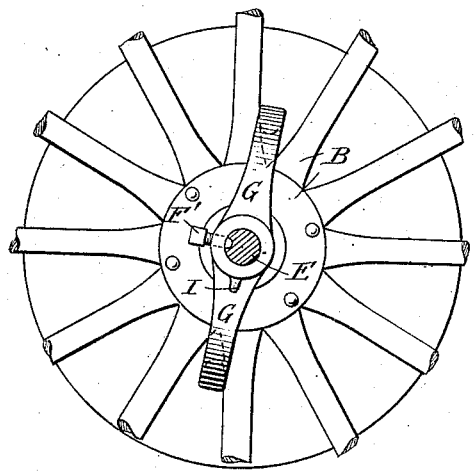
Fig. 2 is a fragmentary view showing in elevation a wheel-engaging clutch.
Figure 3:
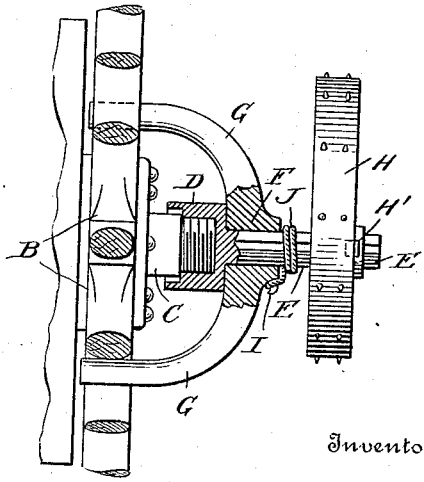
Fig. 3 is an enlarged detail view looking from the left in Fig. 1.

When the devices are needed, the stub shaft is put in place, the sleeve arms are engaged with the spokes, and the sleeve is locked to the shaft. The cable may then be attached to the hook I and its free end be carried forward and secured to some fixed object such as a tree, post, or stake driven in the earth for this special purpose. If the wheel be then rotated, the cable will wind upon the small shaft and will exert a very strong tractive force tending to advance the machine. Instead of using the cable, or in addition to using the cable, the roller H may be fixed in place by means of the set screw H' which engages in a groove in the shaft. The eccentric roller should have its shorter radius below its shaft, as shown in Fig. 1. Any available log, rail, or plank K may then be pushed beneath the roller while held in its plane. If the wheel be rotated, its periphery bites the wood which its eccentric enlargement presses down until it offers increased resistance when the axle will be lifted and advanced. Continued rotation causes the axle to be repeatedly lifted and lowered while advancing continually, and presently firm ground is reached.

The adjustment of the roller along the shaft is highly important since it is thus given proper bearing on the particular log used, which may vary greatly in size.

An object of making the roller eccentric is to facilitate getting the log into position to support heavy pressure of the roller, the log obviously being pressed downward for some distance, after it has been pushed under the roller, before it can escape this pressure. This is sometimes vital when the earth is quite yielding. Usually after the roller has rotated and advanced the axle, the difficulty is lessened.

When desired, the cable or the roller can be kept in storage on the machine and but one device be put in place. When both are used, the machine is usually, if not invariably quickly advanced to solid ground.

It is rare that no log or the like can be obtained quickly wherever the stalling occurs, but if desired it is obviously possible to carry on the machine, when making country trips, a jointed plank or the like.

It may be noted that where the earth is so soft and yielding that the log or the like sinks under the pressure of the eccentric and the axle is not advanced, the roller may be turned until its shorter radius is again below the shaft when another plank or bit of wood may be shoved under the roller upon the log or plank which has sunk. This may be repeated until the supports offer enough resistance to cause raising and advance of the axle. In this way the power of the engine is used to press into the earth the needed supports, and this is done very quickly.

What I claim is:

1. The combination with an automobile wheel and a detachable stub shaft projecting axially outward from the wheel and arranged to rotate therewith, of a roller rigidly secured to said shaft and having its periphery adapted for non-slipping engagement with a log or the like placed in the earth below the roller and in its plane.

2. The combination with an automobile wheel and its axle, of a stub shaft extension for the axle rotating therewith, and an eccentric roller adjustably fixed upon said extension, substantially as and for the purpose set forth.

3. The combination with an automobile wheel and a stub shaft projecting axially outward therefrom, of a sleeve adjustably fixed to the stub shaft and provided with means for locking it to the wheel, and a cable arranged to wind upon the stub shaft and adapted to be engaged with a distant fixed object approximately in the plane of the wheel.

4. The combination with an automobile wheel and its axle, of a stub shaft forming an alining detachable extension for the axle, a sleeve revolubly and adjustably mounted on the stub shaft and provided with arms for engaging the spokes of the wheel by its own bodily rotation, means for locking the sleeve when adjusted, a roller arranged to slide along the stub shaft to the plane of the axis of a log, or the like, below, and means for locking the roller in any desired adjustment on the stub shaft.

5. The combination with an automobile wheel and its axle, of a roller outside the wheel, parallel thereto, rotating therewith and eccentric with respect to the axle, whereby the roller may rest upon a log in the earth alongside the wheel and lift the axle while advancing it along the log if the log affords sufficient resistance before the eccentric roller ceases to urge it still deeper into the earth.

In testimony whereof I hereunto affix my signature.

HORATIO B. HOLLIFIELD.